US011401452B2

(12) United States Patent
Farmer et al.

(10) Patent No.: US 11,401,452 B2
(45) Date of Patent: Aug. 2, 2022

(54) METHODS OF SELECTIVE AND NON-SELECTIVE PLUGGING FOR WATER FLOODING IN ENHANCED OIL RECOVERY

(71) Applicant: Locus Oil IP Company, LLC, Solon, OH (US)

(72) Inventors: Sean Farmer, North Miami Beach, FL (US); Ken Alibek, Solon, OH (US); Karthik N. Karathur, Solon, OH (US); Alibek Moldakozhayev, Solon, OH (US)

(73) Assignee: LOCUS OIL IP COMPANY, LLC, Solon, OH (US)

( * ) Notice: Subject to any disclaimer, the term of this patent is extended or adjusted under 35 U.S.C. 154(b) by 0 days.

(21) Appl. No.: 16/634,390

(22) PCT Filed: Jul. 17, 2018

(86) PCT No.: PCT/US2018/042412
§ 371 (c)(1),
(2) Date: Jan. 27, 2020

(87) PCT Pub. No.: WO2019/022996
PCT Pub. Date: Jan. 31, 2019

(65) Prior Publication Data
US 2020/0172788 A1 Jun. 4, 2020

Related U.S. Application Data

(60) Provisional application No. 62/537,622, filed on Jul. 27, 2017.

(51) Int. Cl.
| E21B 43/16 | (2006.01) |
| C09K 8/42 | (2006.01) |
| C09K 8/584 | (2006.01) |
| C09K 8/588 | (2006.01) |

(52) U.S. Cl.
CPC ............ C09K 8/426 (2013.01); C09K 8/584 (2013.01); C09K 8/588 (2013.01); E21B 43/16 (2013.01)

(58) Field of Classification Search
CPC ........ C09K 8/426; C09K 8/584; C09K 8/588; E21B 43/16
See application file for complete search history.

(56) References Cited

U.S. PATENT DOCUMENTS

| 3,191,676 A | 6/1965 | Froning |
| 3,581,824 A * | 6/1971 | Hurd .................. C09K 8/905 166/270 |
| 4,369,125 A * | 1/1983 | Kragen .................. A61L 9/048 106/205.01 |
| 4,450,908 A | 5/1984 | Hitzman |
| 4,522,291 A | 6/1985 | McInerney et al. |
| 4,561,501 A | 12/1985 | Shaw et al. |
| 4,905,761 A | 3/1990 | Bryant |
| 5,156,652 A | 10/1992 | Gregoli et al. |
| 5,165,477 A | 11/1992 | Shell et al. |
| 5,869,325 A | 2/1999 | Crabtree et al. |
| 6,033,901 A | 3/2000 | Powell, Jr. |
| 8,188,012 B2 | 5/2012 | Weerasooriya et al. |
| 9,422,470 B2 | 8/2016 | Xu et al. |
| 9,683,164 B2 | 6/2017 | Gunawan et al. |
| 9,725,986 B2 | 8/2017 | Xu et al. |
| 10,023,787 B2 | 7/2018 | Benoit et al. |
| 10,190,038 B2 | 1/2019 | Armstrong et al. |
| 2004/0231845 A1 | 11/2004 | Cooke, Jr. |
| 2007/0125536 A1 * | 6/2007 | Acock .................. E21B 43/267 166/280.2 |
| 2007/0151726 A1 | 7/2007 | Crews et al. |
| 2008/0302531 A1 | 12/2008 | Berger et al. |
| 2009/0029879 A1 | 1/2009 | Soni et al. |
| 2010/0018972 A1 * | 1/2010 | Kao .................. B65D 51/1633 220/212 |
| 2010/0044031 A1 | 2/2010 | Fallon et al. |
| 2011/0139262 A1 | 6/2011 | Aburto Anell et al. |
| 2011/0290482 A1 | 12/2011 | Weerasooriya et al. |
| 2012/0037368 A1 | 2/2012 | Eick et al. |
| 2012/0122740 A1 | 5/2012 | Roldan Carrillo et al. |
| 2012/0214713 A1 | 8/2012 | Mu et al. |
| 2012/0292022 A1 | 11/2012 | Choban et al. |
| 2013/0020082 A1 * | 1/2013 | Lumsden ............... C09K 8/588 166/279 |
| 2013/0040869 A1 * | 2/2013 | Cox ......................... A61Q 5/02 510/119 |
| 2013/0062053 A1 | 3/2013 | Kohr et al. |
| 2013/0319656 A1 | 12/2013 | Brownlee |
| 2013/0331466 A1 | 12/2013 | Gross et al. |
| 2014/0073541 A1 * | 3/2014 | Ravikiran ............. C09K 8/584 507/254 |
| 2014/0273150 A1 | 9/2014 | Angel |

(Continued)

FOREIGN PATENT DOCUMENTS

| CN | 102352227 A | 2/2012 |
| GB | 2450204 A | 12/2008 |
| WO | 2013110132 A1 | 8/2013 |
| WO | 2017040903 A1 | 3/2017 |
| WO | 2017044953 A1 | 3/2017 |

OTHER PUBLICATIONS

De Almeida, D., et al., "Biosurfactants: Promising Molecules for Petroleum Biotechnology Advances." Frontiers in Microbiology, Oct. 2016, 7(1718): 1-14.

(Continued)

Primary Examiner — Silvana C Runyan
(74) Attorney, Agent, or Firm — Saliwanchik, Lloyd & Eisenschenk

(57) ABSTRACT

Materials and methods for enhanced oil recovery are provided. In particular, a composition for improved selective and non-selective plugging is provided, the composition comprising one or more biological polymers selected from polysaccharides, in addition to one or more bio surfactants Methods are also provided for enhanced oil recovery wherein the biological polymer composition, one or more biosurfactants and one or more solvents are injected into an oil-bearing formation undergoing water flooding.

8 Claims, No Drawings

(56) References Cited

U.S. PATENT DOCUMENTS

| | | | |
|---|---|---|---|
| 2014/0305649 A1* | 10/2014 | Tang | C09K 8/602 166/308.2 |
| 2014/0315765 A1 | 10/2014 | McDaniel | |
| 2014/0332212 A1 | 11/2014 | Ayers et al. | |
| 2014/0360727 A1 | 12/2014 | Milam et al. | |
| 2015/0037302 A1 | 2/2015 | Bralkowski et al. | |
| 2015/0051119 A1 | 2/2015 | Masaki et al. | |
| 2015/0300139 A1* | 10/2015 | Armstrong | E21B 43/26 166/278 |
| 2016/0002521 A1* | 1/2016 | Dillon | C10M 159/02 507/101 |
| 2016/0160111 A1 | 6/2016 | Smith et al. | |
| 2016/0222280 A1 | 8/2016 | Kohr et al. | |
| 2016/0251565 A1* | 9/2016 | Yanagisawa | C09K 8/68 166/308.2 |
| 2016/0333258 A1 | 11/2016 | Drake et al. | |
| 2017/0037301 A1 | 2/2017 | Alwattari | |
| 2017/0044424 A1 | 2/2017 | Dwarakanath et al. | |
| 2019/0292436 A1 | 9/2019 | Mason et al. | |

OTHER PUBLICATIONS

De Oliveira, M., et al., "Review: Sophorolipids A Promising Biosurfactant and it's Applications." International Journal of Advanced Biotechnology and Research, 2015, 6(2): 161-174.

Elshafie, A. E., et al., "Sophorolipids Production by Candida bombicola ATCC 22214 and its Potential Application in Microbial Enhanced Oil Recovery " Frontiers in Microbiology, Nov. 2015, 6(1324): 1-11.

Ghojavand, H. et al., "Isolation of thermotolerant, halotolerant, facultative biosurfactant-producing bacteria." Appl. Microbiol. Biotechnol, Oct. 2008, 80(6): Abstract, doi: 10,1007/s00253-008-1570-7.

Gudina, E., et al., "Biosurfactant-producing and oil-degrading Bacillus subtilis strains enhance oil recovery in laboratory sand-pack columns." Journal of Hazardous Materials, 2013, 261: 106-113.

Nur, H.A., et al., "*Saccharomyces cerevisiae* from Baker's Yeast for Lower Oil Viscosity and Beneficial Metabolite to Improve Oil Recovery: An Overview." Applied Mechanics and Materials, 2014, 625: 522-525.

Pacwa-Plociniczak, M. et al., "Review: Environmental Applications of Biosurfactants: Recent Advances." Int. J. Mol. Sci., 2011, 12: 633-654.

Rocha E Silva, F.C.P., et al., "Yeasts and bacterial biosurfactants as demulsifiers for petroleum derivative in seawater emulsions." AMB Expr., 2007, 7(202): 1-13.

Sharma, A. et al., "A study on biosurfactant production in *Lactobacillus* and *Bacillus* sp." Int. J. Curr. Microbiol. App. Sci., 2014, 3(11): 723-733.

Amani, H., et al., "Comparative study of biosurfactant producing bacteria in MEOR applications." Journal of Petroleum Science and Engineering. 2010, 75:209-214.

El-Sheshtawy, H.S., et al., "Production of biosurfactants by Bacillus licheniformis and Candida albicans for application in microbial enhanced oil recovery." Egyptian Journal of Petroleum, 2016, 25: 293-298.

Ines, M., et al., "Glycolipids biosurfactants; potential related biomedical and biotechnical applications." Carbohydrate Research, 2015, 416: 59-69.

Kaur, K., et al., "Biosurfactant production by yeasts isolated from hydrocarbon polluted environments." Environ Monit Assess, 2017, 189 (603: 1-13.

Kulakovskaya, E., et al., "Structure and Occurrence of Yeast Extracellular Glycolipids." Extracellular Glycolipids of Yeasts, eds E. Kulakovskaya and T. Kulakovskaya (Amsterdam: Elsevier), 2014: 1-13.

Kurtzman, C.P., et al., "Production of sophorolipid biosurfactants by multiple species of the Starmerella (Candida) bombicolayeast clade." FEMS Microbiol Lett, 2010, 311: 140-146.

Ma, X., et al., "Surface and biological activity of sophorolipid molecules produced by Wickerhamiella domercqiae var. sophorolipid CGMCC 1576." Journal of Colloid and Interface Science, 2012, 376: 165-172.

Santos, D.K.F., et al., "Biosurfactants: Multifunctional Biomolecules of the 21st Century." International Journal of Molecular Sciences, 2016,17(401): 1-31.

Silva, R., et al., "Applications of Biosurfactants in the Petroleum Industry and the Remediation of Oil Spills." International Journal of Molecular Sciences, 2014, 15: 12523-12542.

Wadekar, S., et al., "Sophorolipid Production by Starmerella bombicola (ATCC 22214) from Virgin and Waste Frying Dils, and the Effects of Activated Earth Treatment of the Waste Oils." J Am Oil Chem Soc, 2012, 89:1029-1039.

Youssef, N., et al., "In Situ Biosurfactant Production by Bacillus Strains Injected into a Limestone Petroleum Reservoir." Applied and Environmental Microbiology, Feb. 2007, 73(4): 1239-1247.

* cited by examiner

METHODS OF SELECTIVE AND NON-SELECTIVE PLUGGING FOR WATER FLOODING IN ENHANCED OIL RECOVERY

CROSS-REFERENCE TO RELATED APPLICATION

This application is a National Stage Application of International Application No. PCT/US2018/042412, filed Jul. 17, 2018 which claims priority to U.S. Provisional Patent Application Ser. No. 62/537,622, filed Jul. 27, 2017, which are incorporated by reference herein in their entirety.

BACKGROUND OF THE INVENTION

The high demand for fossil fuels necessitates efficient production of oil. As oil wells mature, it becomes more difficult and costly to continue to pump oil at an economically viable rate. Therefore, there is a continuing need to develop improved methods of oil recovery.

Oil exists in small pores and narrow fissures within the body of reservoir rocks underneath the surface of the earth. Natural pressure of the reservoir causes the oil to flow up to the surface, thereby providing primary production; however as oil production progresses, the reservoir pressure is depleted to a point at which artificial lift or pumping is required to maintain an economical rate of oil production.

At this point, secondary recovery may be necessary to achieve additional oil recovery, which involves providing external energy sources. The extra energy can be introduced by injecting gas (gas injection) and/or water (water flooding). With water flooding in particular, water is injected into the subterranean oil reservoir for the purpose of displacing the crude oil from the pore spaces of the reservoir rock towards the producing wells. The water is typically injected into a series of boreholes or wells surrounding a centrally located producing well, then collected, filtered, and recycled. This cyclic pattern of water injection and residual oil production can be repeated throughout the reservoir.

Primary recovery generally results in an average recovery of only a fraction of the oil originally present in an oil bearing formation. Secondary recovery, e.g., water flooding, generally recovers another 10% by the time it becomes uneconomical to continue. It is not unusual, then, for 60 to 70% of the oil originally in the formation to remain, even after secondary recovery reaches is economical limit.

Two major factors contribute to unrecovered oil remaining trapped in a formation. The first factor is capillary forces that arise because of the high oil/water interfacial tension. This problem can be addressed by techniques such as flooding with gas (e.g., $CO_2$ or $N_2$), or chemicals (e.g., alkaline or surfactant flooding). Additionally, when highly viscous, heavy oils are present in a subterranean formation, the flood water has a greater tendency to bypass substantial portions of the formation due to its mobility and low viscosity. This can be addressed by increasing the viscosity of the flooding water, which is often achieved using materials such as water-soluble or water-dispersible, high molecular weight polymers; however, adverse environmental conditions within the subterranean formation, such as high temperature and dissolved electrolytes, can cause some polymers to precipitate and/or lose their viscosity-enhancing effectiveness, thus increasing flood water mobility again.

The other major factor leading to unrecovered oil in formations is the heterogeneity of permeability in a reservoir, which determines the ability of the rock comprising the oil-bearing zone or zones to transmit flow under an imposed pressure gradient. Permeability is the conductivity of a porous solid to fluid flow. If fluid flows relatively easily through a type of rock under a fixed pressure driving force, then that rock is said to have a high permeability. If it is difficult to force fluid through a type of rock, then that rock has a low permeability.

In a reservoir, the materials comprising the different oil-producing layers usually have different permeabilities. Oil and water will usually flow much more easily through some of the layers than through others, simply because the physical makeup of the rock is different in the various oil-producing zones. If a reservoir containing multiples zones (a layered reservoir) is involved in a waterflood treatment, it is well known that the zones with the higher permeabilities and greater thicknesses will receive more water than the low-permeability or thin zones. Furthermore, once water passes through a zone and pushes some of the oil out, the permeability of that zone to the injected water increases even more.

The net effect is that in many cases, the overwhelming majority of the water that is injected throughout the life of a waterflood passes cleanly through the high permeability zones, and very little water enters the low permeability zones. Oil that is originally in place in the high permeability zones is eventually displaced relatively efficiently, while oil trapped in the low permeability zones remains largely unrecovered, thereby resulting in relatively poor sweep efficiency of the aqueous flooding agent.

To improve recovery from layered reservoirs, a greater fraction of the injected water must be injected into the low permeability zones. Treatments designed to achieve this alter the flow fractions or flow profile to the different oil-bearing zones and are thus called "profile modification" treatments. Various methods have been developed to alter the distribution of water flow to the different zones.

One method involves the reduction in viscosity (i.e., resistance to flow) of all the fluids in the reservoir, for example, by in situ combustion or steam flooding. In situ combustion is difficult to control and maintain, however, and usually requires continuous oxygen or air injection. This method tends to be economical only with heavy crudes.

Another method involves creating a more uniform flood front by controlling or adjusting the permeability of the more permeable strata of the formation in the flood zone. This can be achieved through selective plugging, which involves the injection of plugging materials into the more permeable strata to at least partially plug the permeable zones. Plugging can be achieved by the in situ formation of plugging material in the permeable strata after one or more reactant substances are injected therein. The reactant substances then chemically react with a substance naturally occurring in the structure, or with a second reactant material injected, to form a solid residue. These reactant substances often include various hydraulic cements, precipitate forming materials, and monomers or prepolymers that are polymerizable under formation conditions.

One example of plugging includes polymer gel treatment, where an aqueous polymer solution is crosslinked, or reacted, to form a stable gel. After crosslinking, the gel is injected into the water-injection wells. The gel flows into all of the oil-producing zones, but primarily into the high permeability zones, because the resistance to flow into those areas is the lowest. Once in place, the polymer undergoes a partial re-gelling in the porespace of the rock, which partially plugs the zone and reduces its permeability. When water injection is resumed, the water will encounter a greater flow resistance in the high permeability zones than it had before. Water can then be redirected into previously unswept, lower permeability zones.

In general, polymer gel treatments for profile modification can have serious drawbacks, which in many cases can reduce the efficiency of the waterflood. When the gel is injected, it flows like a liquid. The majority of the gel does flow into the high permeability area, but some fraction of the gel also flows into the low permeability zones. Gel that enters the low permeability streaks also results in partial plugging of those areas, and because permeability reduction very near the wellbore has a much greater effect on the overall flow profile than does plugging further into the formation, any gel that penetrates significantly into the low permeability zone can negate any beneficial effects of the treatment.

Furthermore, gels tend to have a greater effect on reducing permeability in rock having a low permeability to begin with. These effects can lead to a situation where, even when the majority of the gel enters the high permeability area, the relative permeability reduction in the low permeability zone is greater. When this happens, the net effect of the treatment is to increase rather than decrease the fractional flow of water to the already cleanly-swept high permeability zones.

Water flooding operations can also lead to the intrusion of water into a well. Not only does this water intrusion cause production and disposal problems, but some of the beneficial effects of the natural water drive is lost, thereby adversely affecting oil recovery. Accordingly, it is advantageous to at least partially plug the more permeable water channels so as to render the formation more uniformly permeable and increase the sweep efficiency of the water drive, or alternatively, to shut off the water intrusion. Nonetheless, selective plugging of these water channels has presented great difficulty, as it is necessary to affect at least a partial water plug without adversely affecting the permeability of the formation for oil production.

While the foregoing methods of permeability control in a water flooding operation can be sufficiently effective to produce an increase in oil recovery, many reservoirs fail to respond to treatment and the incremental oil recovery in other reservoirs is undesirably small. Further, even with the most successful of the known selective plugging treatments, oil recoveries are far from complete.

Given the importance of maximizing oil production from oil wells, methods of enhanced oil recovery are a continuing need. In particular, improvements are needed for current methods of water flooding due to the challenges caused by variable formation permeability. Thus, provided herein are materials and methods for selective and non-selective plugging, which allow for improved water flooding and enhanced oil recovery.

BRIEF SUMMARY OF THE INVENTION

The subject invention provides improved materials and methods of enhanced oil recovery. Specifically, the subject invention provides improvements for current water flooding methods, including compositions and methods of their use in selective and non-selective plugging. Advantageously, the compositions and methods of the subject invention are environmentally-friendly, operational-friendly and cost-effective.

In general, the subject invention can be used to reduce the permeability of subterranean formations, preferably in a formation having non-uniform permeability. This can be achieved through the selective plugging of the zones or segments of a subterranean formation having high permeability, meaning a greater permeability in comparison to the surrounding zones or segments of the formation.

The subject invention can also be used for improved water flooding, wherein channels in the formation that have been carved out over time by water injected into a formation can be plugged to encourage water flow into lower permeability areas. In this embodiment, the plugging composition of the subject invention achieve selective or non-selective plugging of permeable water channels of a subterranean formation, thereby promoting control of fluid injection patterns and improving the enhanced recovery of oil and other hydrocarbons. Furthermore, the subject invention can be used for controlling water intrusion into a producing well.

In one embodiment, compositions are provided for improved selective or non-selective plugging capacity in a subterranean formation, wherein the composition comprises one or more biological polymers. This plugging composition is preferably of lower viscosity when first prepared, but is capable of becoming highly viscous over time, for example, more viscous than the oil present in the well. In one embodiment, the viscosity reaches a level greater than 10 centipoises (cp). In another embodiment, the viscosity can reach a level greater than 200 cp.

The biological polymers can be selected from any number of polysaccharide biopolymers, for example, xanthan gum, guar gum, welan gum, levan, alginate, and/or cellulose. In a preferred embodiment, the plugging composition comprises xanthan gum and guar gum at a certain ratio to achieve the desired viscosity and or the desired settling or gelling rate. In one embodiment, the ratio of xanthan gum to guar gum is 50% or greater xanthan gum to 50% or less guar gum. Advantageously, the composition has a synergistic increase in viscosity when compared to, for example, using either xanthan gum or guar gum standing alone.

In some embodiments, the plugging composition can further comprise one or more biosurfactants, such as, for example, glycolipids including sophorolipids (SLP), rhamnolipids (RLP), trehalose lipids (TL) and mannosylerythritol lipids (MEL), and/or lipopeptides including surfactin, iturin, fengycin and lichenysin. The use of combinations of these biosurfactants is also envisioned.

The subject invention further provides methods for enhancing recovery of oil from an oil-bearing formation, comprising a first step of injecting a plugging composition comprising one or more biological polymers into the oil-bearing formation. Preferably, the biological polymers are xanthan gum and guar gum. In certain embodiments, the oil-bearing formation has non-uniform permeability.

In one embodiment, the methods can be used for stimulating an injection well and for increasing oil flow and production from a well or oil-bearing formation.

In one embodiment the methods can be used for non-selective plugging, wherein the plugging composition is applied to the formation at a viscosity and concentration such that the composition can effectively reduce the permeability of all zones of the formation, including low and high permeability zones.

When plugging of all zones is not desired, the subject methods can be used for selective plugging, wherein the plugging composition has a viscosity and concentration such that the composition can selectively reduce the permeability of high permeability zones of the formation.

In another embodiment, the subject invention provides methods of enhanced oil recovery, wherein the plugging composition is injected into an oil-bearing formation undergoing water flooding treatment. The composition can be applied to the formation via an injection well in an amount, and at a rate, such that the composition passes down the well and penetrates into the high permeability zones of the formation, wherein the composition adsorbs and/or gels, thereby plugging, or reducing the fluid permeability, of those high permeability zones.

According to the subject methods, the plugging composition can be mixed prior to application, or the one or more biopolymers can be added sequentially, i.e., one after the other. Herein, "after" means within 60 minutes, 30 minutes, 20 minutes, 10 minutes, 5, 4, 3, 2 minutes, 1 minute, or 30 seconds or less, after. The timing can be optimized according to the rate of adsorption and/or gelling desired to occur in the formation.

In one embodiment, the subject method comprises applying one or more biosurfactants to the formation. The one or more biosurfactants can be mixed with the one or more biopolymers prior to application, or they can be added after the one or more biopolymers.

In some embodiments, the one or more biosurfactants can be, for example, glycolipids including sophorolipids (SLP), rhamnolipids (RLP), trehalose lipids (TL) and mannosylerythritol lipids (MEL), and/or lipopeptides including surfactin, iturin, fengycin and lichenysin. The use of combinations of these biosurfactants is also envisioned.

The injection of biosurfactants helps to reduce the interfacial tension between water, oil and rock in the oil-bearing formation, which can, inter alia, increase the wettability of the rock within the formation and increase the mobility of the oil.

In one embodiment, the method further comprises injecting effective amounts of one or more solvents, including, for example, isopropyl alcohol and/or ammonium hydroxide, into the oil-bearing formation.

The one or more solvents can be selected from, for example, ammonium hydroxide, ethanol, propanol and isopropyl alcohol, although preferably, the one or more solvents comprise isopropyl alcohol and/or ammonium hydroxide.

In one embodiment, the one or more solvents are pre-mixed and injected as a single composition into the formation. In one embodiment, if more than one solvent is used, the solvents can be injected separately in any order.

Advantageously, the present invention can be used without releasing large quantities of inorganic compounds into the environment. Additionally, the compositions and methods utilize components that are biodegradable and toxicologically safe. Thus, the present invention can be used in all possible operations of oil and gas production as a "green" treatment.

DETAILED DESCRIPTION

The subject invention provides improved materials and methods of enhanced oil recovery and/or secondary oil recovery. Specifically, the subject invention provides improved methods for water flooding, including compositions and methods of their use for selective and non-selective plugging in oil-bearing formations. Advantageously, the compositions and methods of the subject invention are environmentally-friendly, operational-friendly and cost-effective.

In general, the subject invention can be used to reduce the permeability of subterranean formations, preferably in a formation having non-uniform permeability. This can be achieved through the selective plugging of the zones or segments of a subterranean formation having high permeability, meaning greater permeability when compared to that of the surrounding zones or segments of the formation.

The subject invention can also be used for improved water flooding, wherein the selective or non-selective plugging of permeable water channels of a subterranean formation is achieved, thereby promoting control of fluid injection patterns and improving the enhanced recovery of oil and other hydrocarbons. Furthermore, the subject invention can be used for controlling water intrusion into a producing well.

In one embodiment, compositions are provided for improved selective or non-selective plugging capacity in a subterranean formation, wherein the composition comprises one or more biological polymers. This plugging composition is preferably of lower viscosity when first prepared, but is capable of becoming highly viscous over time, for example, more viscous than the oil present in the well.

In one embodiment the composition further comprises one or more biosurfactants for reducing the interfacial tension between oil, water and rock in an oil-bearing formation, and for promoting deep penetration of the composition into an oil-bearing formation.

In another embodiment, the subject invention provides methods of enhanced oil recovery, wherein the plugging composition is injected into an oil-bearing formation. In one embodiment, the formation is undergoing water flooding treatment. The composition can be applied to the formation via an injection well in an amount, and at a rate, such that the composition passes down the well and penetrates into the high permeability zones of the formation, wherein the composition adsorbs and/or gels, thereby plugging, or reducing the fluid permeability, of those high permeability zones.

The method can further comprise injecting one or more biosurfactants and one or more solvents into the formation.

Selected Definitions

As used herein, "biosurfactant" means a surface-active substance produced by microorganisms. Most biosurfactant-producing organisms produce biosurfactants in response to the presence of a hydrocarbon source (e.g. oils, sugar, glycerol, etc.) in the growing media. Other media components such as concentration of iron can also affect biosurfactant production significantly. All biosurfactants are amphiphiles. They consist of two parts: a polar (hydrophilic) moiety and non-polar (hydrophobic) group. Due to their amphiphilic structure, biosurfactants can, inter alia, increase the surface area of hydrophobic water-insoluble substances, increase the water bioavailability of such substances, and change the properties of bacterial cell surfaces. Further description of biosurfactants can be found elsewhere within the present description.

As used herein, "heavy oil" or "heavy hydrocarbons" mean viscous hydrocarbon fluids. Heavy hydrocarbons may include highly viscous hydrocarbon fluids such as heavy oil, extra heavy oil, tar, and/or asphalt. Heavy and extra heavy oils are highly viscous with a density close to or even exceeding water. Heavy hydrocarbons may comprise moderate to high quantities of paraffins, resins and asphaltenes, as well as smaller concentrations of sulfur, oxygen, and nitrogen. Heavy hydrocarbons may also include aromatics or other complex ring hydrocarbons. Additional elements may also be present in heavy hydrocarbons in trace amounts. Heavy hydrocarbons may be classified by API gravity. Heavy hydrocarbons generally have an API gravity below about 20°. Heavy oil, for example, generally has an API gravity of about 10-20°, whereas extra heavy oil generally has an API gravity below about 12°. The viscosity of heavy hydrocarbons is generally greater than about 200 cp at reservoir conditions, and that of extra heavy oil is generally about 10,000 cp or more.

As used herein, an "isolated" or "purified" nucleic acid molecule, polynucleotide, polypeptide, protein or organic compound, such as a small molecule, is substantially free of other compounds, such as cellular material, with which it is associated in nature. For example, an isolated microbial strain may exist as, for example, a biologically pure culture, or as spores (or other forms of the strain) in association with a carrier. A purified or isolated polynucleotide (ribonucleic acid (RNA) or deoxyribonucleic acid (DNA)) is free of the genes or sequences that flank it in its naturally-occurring state. A purified or isolated polypeptide is free of other molecules, or the amino acids that flank it, in its naturally-occurring state.

In certain embodiments, purified compounds are at least 60% by weight the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

As used herein, "polymer" refers to any macromolecular compound prepared by bonding one or more similar molecular units, called monomers, together. Polymers include synthetic and natural polymers. Exemplary polymers include rubbers, starches, resins, gums (e.g., guar gum, xanthan gum, and welan gum), neoprene, nylon, PVC, silicone, cellulose, polystyrene, polyethylene, polypropylene, polyacrylonitrile, polyamines, polysaccharides (e.g., levan), polynucleotides, polybutylene adipate terephthalate (PBAT), polyhydroxyalkanoates (PHAs), polybytlene succinate (PBS), polycaprolactone (PCL), polyglycolic acid (PGA), polyhydroxybutyrates (PHBs), polyesters such as polylactide (PLA), polyacrylamides (PAM), and others.

Further included in the term polymer is the term "biopolymer," "biological polymer" or "renewable polymer," which as used herein, means a natural polymeric substance, or a polymeric substance occurring in a living organism. One characteristic of biopolymers is their ability to biodegrade. Biopolymers can include polynucleotides (e.g., RNA and DNA), polysaccharides (e.g., linearly bonded polymeric carbohydrates), and polypeptides (i.e., short polymers of amino acids). Specific examples of biopolymers include, but are not limited to, rubbers, suberin, melanin, lignin, cellulose, xanthan gum, guar gum, welan gum, levan, alginate, and many others.

As used herein, "plugging" as used in the context of water flooding processes means the adjustment of permeability in a zone or zones of an oil-bearing formation. Plugging can further comprise "permeability control." Furthermore, plugging can be selective, meaning only high permeability zones are subjected to permeability control, or non-selective, meaning permeability is controlled in all permeable zones, regardless of level of permeability. In selective plugging particularly, the high permeability zones are more effectively plugged by a plugging material and undesirable plugging of the low permeability zones is reduced. When water flooding is resumed, the result is a net decrease in water flow in the high permeability zones and improved oil displacement in low permeability areas.

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19, and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduces" means a negative alteration of at least 1%, 5%, 10%, 25%, 50%, 75%, or 100%.

As used herein, "reference" means a standard or control condition.

As used herein, "secondary oil recovery," "tertiary oil recovery," "post-primary oil recovery" and "enhanced oil recovery" mean supplemental oil recovery operations that are employed in an oil-bearing formation or oil well after primary oil recovery is not feasible or becomes infeasible. That is, secondary oil recovery operations are implemented if the initial formation energy is inadequate for producing oil, or has become depleted.

As used herein, "surfactant" means a surface-active compound that lowers the surface tension (or interfacial tension) between two liquids or between a liquid and a solid. Surfactants act as, e.g., detergents, wetting agents, emulsifiers, foaming agents, and/or dispersants.

As used herein, "water flooding" refers to the injection of fluid, such as field water or field brine, into a formation by pumping it through one or more injection wells drilled into the formation. Oil is displaced within and is moved through the formation, and is produced from one or more production wells drilled into the formation. The injection water is often referred to as "flooding liquid," "flooding water" or "flood water," as distinguished from "connate water," or the in situ formation water. Fluids injected later can be referred to as driving fluids. Although water is the most common, injection and drive fluids can include gaseous fluids such as steam, carbon dioxide, and the like.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

All references cited herein are hereby incorporated by reference in their entirety.

Biopolymer Plugging Compositions

In one embodiment, compositions are provided for improved selective or non-selective plugging capacity in a subterranean formation, wherein the composition comprises one or more biological polymers.

The subject composition is capable of forming a viscous, gel-like substance that effectively adsorbs to a rock surface and controls the permeability of the rock pores. In one embodiment, the plugging composition has a lower viscosity when first prepared, but is preferably capable of becoming highly viscous over time, for example, reaching viscosities greater than heavy oil.

The biological polymers can be selected from any number of biopolymers that are capable of selective penetration. A polymer that exhibits selective penetration will show preference in the high permeability zones of a formation when both high and low permeability zones are present. In other words, the polymer is capable of being preferentially diverted into higher permeability zones on its own, without the use of mechanical diversion, wherein it can adsorb onto rock surfaces, thus reducing the permeability through the rock pores.

Preferably, although it is not required, the biopolymers are water-soluble or water-dispersible polysaccharides. Non-limiting examples of suitable polysaccharide biopolymers include xanthan gum, guar gum, welan gum, levan, alginate, and/or cellulose. In a preferred embodiment, the plugging composition comprises xanthan gum and guar gum at a ratio to achieve the desired viscosity and or the desired settling or gelling rate. Advantageously, the composition has a synergistic increase in viscosity when compared to, for example, using either xanthan gum or guar gum standing alone.

Xanthan or xanthan gum is the extracellularly produced heteropolysaccharide made by a bacterium of the genus *Xanthomonas*. Examples of *Xanthomonas* species that may suitably be used to produce xanthan gum include *Xanthomonas campestris, Xanthomonas begonias, Xanthomonas malvaceraum, Xanthomonas carotae, Xanthomonas incanae, Xanthomonas phaseoli, Xanthomonas vesicatoria, Xanthomonas papavericola, Xanthomonas translucens, Xanthomonas vesicatoria,* and *Xanthomonas hedrae*. Xanthan can be produced by aerobic submerged fermentation of a bacterium of the genus *Xanthomonas*. The fermentation medium typically contains carbohydrate (such as sugar), trace elements and other nutrients. Once fermentation is complete, the resulting fermentation broth is typically heat-treated. Following heat-treatment, the xanthan is recovered by alcohol precipitation.

Guar, guar gum or guaran is the galactomannan polysaccharide produced from guar beans, or *Cyamopsis tetragonoloba*. Guar gum is often used as a food additive, but also in, for example, the fracking, cosmetics, pharmaceuticals and paper industries. Typically, guar gum is produced manually or even on an industrial scale through the dehusking, milling, and screening of guar seeds.

Advantageously, the xanthan gum/guar gum composition creates a synergistic system, wherein combining the two biopolymers increases the viscosity to a level greater than either xanthan gum or guar gum alone, without the use of further viscosifying agents.

The subject plugging composition can be aqueous, and furthermore, can comprise brackish water, such as seawater, and/or brine as the aqueous medium. Advantageously, this allows for use of the water available at a drilling site, including an off-shore drilling site, thus reducing the cost of shipping large quantities of fresh water to the site.

In certain embodiments, the reactivity of the subject composition is sufficiently controllable such that high permeability segments can be plugged in an operationally-feasible time over a wide range of formation temperatures. These temperatures may range from 10° to 250° C.

In some embodiments, the composition is also resistant to all conventional flooding liquids, some of which may be used at elevated temperatures, and to steam injected to recover viscous oil from the oil-bearing stratum; this steam may be superheated to temperatures of at least 315° C. or more.

In some embodiments, the plugging composition has low viscosity when first formulated and remains low for an extended period of time (which may vary from several hours to several weeks) to allow its flow into the high fluid permeability segment. This allows the composition to be useful in deep wells, for example, wherein the composition must flow a considerable distance after injection to reach the high permeability segments.

Additionally, where only a reduction in permeability of the high permeability segments is desired, the composition can be formulated in such a manner as to allow, for example, only partial plugging of the high permeability zones.

In some embodiments, the composition can gel in the presence of residual oil, meaning the composition can be useful in high permeability segments that are still wet with oil.

In further embodiments, the composition can gel in the presence of brine, as well as resist deterioration during prolonged exposure to brine.

The subject composition has a relatively low viscosity when first prepared, preferably in the range of from about 1 to about 10 cp. This allows the composition to be injected down a well with ease. In some embodiments, viscosity of the composition will reach the desired levels in a matter of a few hours to several days after preparation, for example, from 3 hours to 72 hours to over a week after being first prepared and/or after injection into a formation. As the composition is diverted further into the well after injection and towards higher permeability zones, a final viscosity of about 200 cp to over 10,000 cp or more is preferred.

Furthermore the composition can retain most, if not all, of its viscosity after, for example, 500 days or more in the well.

The gel time of the subject composition depends upon a number of factors, including the total solids content of the composition, the exact chemical nature and proportion of the various components in the composition, the temperature of the high fluid permeability segment in which gelling takes place and the quantity of ions which are either deliberately introduced into the composition or which become admixed therewith because of the presence of brines in the high fluid permeability segment.

The pH of the composition should be chosen with regard to the nature of the strata into which they are to be injected. Accordingly, the composition can comprise pH adjusting agents, such as buffers, alkali metal hydroxides, alkali metal carbonates, alkali metal phosphates and other similar compounds known to those skilled in the art.

The total amount of polymeric material in the composition can range from about 5 grams to about 20 grams of biopolymer per liter, or from about 1,000 to about 4,000 ppm in the solution, preferably between about 1,500 to about 3,000 ppm. The concentration of polymers in the plugging composition can range from between 0.1 to 10 weight percent. Furthermore the ratio of xanthan gum to guar gum in the composition can be, for example, 50:50, 60:40, 70:30, 80:20 to 90:10. Preferably, the amount of guar gum is never greater than the amount of xanthan gum. In certain embodiments, the ratio is 50% xanthan gum to 50% guar gum, preferably 60% xanthan gum to 40% guar gum, and more preferably 70% xanthan gum to 30% guar gum.

In one embodiment, the plugging composition further comprises one or more biosurfactants. Biosurfactants accumulate at interfaces, thus reducing interfacial tension and leading to the formation of aggregated micellular structures in solution. Safe, effective microbial bio-surfactants reduce the surface and interfacial tensions between the molecules of liquids, solids, and gases. As discussed herein, this activity can be highly advantageous in the context of oil recovery, by improving the depth of penetration of a plugging composition into a formation, as well as increasing the wettability of rock and increasing the mobility of oil out of a formation.

Biosurfactants include low molecular weight glycolipids (GLs), lipopeptides (LPs), flavolipids (FLs), phospholipids, and high molecular weight polymers such as lipoproteins, lipopolysaccharide-protein complexes, and polysaccharide-protein-fatty acid complexes. The hydrocarbon chain of a fatty acid acts as the common lipophilic moiety of a biosurfactant molecule, whereas the hydrophilic part is formed by ester or alcohol groups of neutral lipids, by the carboxylate group of fatty acids or amino acids (or peptides), organic acid in the case of flavolipids, or, in the case of glycolipids, by the carbohydrate.

Microbial biosurfactants are produced by a variety of microorganisms such as bacteria, fungi, and yeasts. Exemplary biosurfactant-producing microorganisms include *Pseudomonas* species (*P. aeruginosa, P. putida, P. florescens, P. fragi, P. syringae*); *Flavobacterium* spp.; *Bacillus* spp. (*B. subtilis, B. pumillus, B. cereus, B. licheniformis*); *Wickerhamomyces* spp. (e.g., *Wickerhamomyces anomalus*), *Candida* spp. (*C. albicans, C. rugosa, C. tropicalis, C. lipolytica, C. torulopsis*); *Rhodococcus* spp.; *Arthrobacter* spp.; *Campylobacter* spp.; *Cornybacterium* spp.; *Pichia* spp. (e.g., *Pichia anomala*); *Starmerella* spp. (*Starmerella bombicola*); *Pseudozyma* spp. (e.g., *Pseudozyma aphidis*), and so on. The biosurfactants may be obtained by fermentation processes known in the art.

Other microbial strains including, for example, other fungal strains capable of accumulating significant amounts of, for example, glycolipid-biosurfactants, mannoprotein, beta-glucan and other metabolites that have bio-emulsifying and surface/interfacial tension-reducing properties can be used in accordance with the subject invention.

In one embodiment, the biosurfactants are utilized in purified form. In one embodiment, the biosurfactants are utilized in crude form. Crude form biosurfactants can take the form of a liquid mixture comprising biosurfactant sediment in fermentation broth resulting from cultivation of a biosurfactant-producing microbe. This crude form biosurfactant solution can comprise from about 25% to about 75%, from about 30% to about 70%, from about 35% to about 65%, from about 40% to about 60%, from about 45% to about 55%, or about 50% pure biosurfactant.

Preferably, the one or more biosurfactants are glycolipids selected from sophorolipids (SLP), rhamnolipids (RLP), trehalose lipids (TL) and mannosylerythritol lipids (MEL), and/or lipopeptides selected from surfactin, iturin, fengycin and lichenysin. Even more preferably, the biosurfactant is a sophorolipid (SLP).

The total concentration of biosurfactants in the plugging composition can range from about 0.001 g/L to 20.0 g/L, from about 0.01 g/L to about 10.0 g/L. preferably from about 0.01 to 5.0 g/L.

In one embodiment, the plugging composition can further comprise a de-scaling agent selected from EDTA, sodium citrate and citric acid. In one embodiment, the de-scaling agent can be added to the composition in amounts up to about 5 g/L or more. In specific embodiments, the de-scaling agent is EDTA at a concentration of about 0.5 to 3 g/L.

In one embodiment, the plugging composition further comprises a viscosifier, such as boric acid or borax. The boric acid or borax can be mixed with the one or more biological polymers, or can be added to the plugging composition sometime after it has been applied to a well to further increase its viscosity.

Methods for Enhanced Oil Recovery

The subject invention further provides methods of enhanced oil recovery, wherein a plugging composition of the subject invention is applied to an oil-bearing formation. In one embodiment, the formation is undergoing water flooding treatment.

The composition can be applied to the formation via an injection well in an amount, and at a rate, such that the composition passes down the well and penetrates into the high permeability zones of the formation, wherein the composition adsorbs and/or gels, and plugs, or reduces the fluid permeability, of those high permeability zones.

In one embodiment, the methods can be used for stimulating an oil well or injection well to increase oil flow and production from a well or oil-bearing formation.

As used herein, "applying" a composition or product refers to contacting it with a target or site such that the composition or product can have an effect on that target or site. The effect can be due to, for example, the gelling or adsorption of a polymer substance on a rock. Compositions according to the subject invention can be applied to pipes, tanks, tubes, rods, pumps, equipment, and/or surfaces or materials. The compositions can also be injected into oil wells, injection wells and/or refineries, as well as the piping, pumps, tanks, etc. associated with oil wells, injection wells and/or refineries. The subject compositions can also be applied with flooding waters being injected into an injection well during a water flooding operation.

The total amount of composition and/or liquid comprising additional components that can be injected into the formation can range from about 10% to about 100% of the pore volume of the more highly permeable zones of the formation. Furthermore, from 1-50 gallons to 1,000 barrels, to 10,000 barrels, or more, for example, of the composition can be applied to the composition at an injection rate of, for example, 1 to 20 gallons per minute, or 1 to 20 barrels per minute.

In one embodiment, the subject invention can be used for non-selective plugging, wherein a composition of the subject invention is applied to an oil-bearing formation at a viscosity and concentration such that the composition can effectively reduce the permeability of all zones of the formation, including low and high permeability zones.

When plugging of all zones is not desired, the subject invention provides methods of selective plugging, wherein the composition applied to the formation has a viscosity and concentration such that the composition can selectively reduce the permeability of high permeability zones of the formation.

In one embodiment, the method comprises preparing the biopolymer plugging composition at surface of the formation prior to application. The composition can be prepared in a suitable tank equipped for any known mixing device or method and then pumped down the well and into the formation, employing conventional equipment for pumping such compositions. Preferably, when the biopolymers are combined prior to application to the formation, sufficient time is allowed for the composition to become highly viscous. The biopolymers can be combined from several hours to several days in advance of application, for example, from about 3 hours to about 24 hours to about one week before.

In another embodiment, the method comprises adding the one or more biopolymers into the well sequentially, i.e., one after the other. The time in between application of the one or more biopolymers can range from one minute or less, to 5 minutes, to 30 minutes, to 1 hour, to several hours.

In one embodiment, the subject method comprises injecting effective amounts of one or more biosurfactants to the formation. The one or more biosurfactants can be mixed with the one or more biopolymers prior to application, or they can be added after the one or more biopolymers. The injection of biosurfactants help to reduce the interfacial tension between water, oil and rock in the oil-bearing formation, which can, inter alia, help the one or more biological polymers penetrate deep into a formation, increase the wettability of rock within the formation and increase the mobility of oil.

In some embodiments, the one or more biosurfactants can be, for example, glycolipids including sophorolipids (SLP), rhamnolipids (RLP), trehalose lipids (TL) and mannosylerythritol lipids (MEL), and/or lipopeptides including surfactin, iturin, fengycin and lichenysin. The use of combinations of these biosurfactants is also envisioned.

The total concentration of biosurfactants that are injected can range from about 0.001 g/L to 20.0 g/L, from about 0.01 g/L to about 10.0 g/L. preferably from about 0.01 to 5.0 g/L. In preferred embodiments, the biosurfactant is a sophorolipid in an amount of 5.0 g/L.

In one embodiment, the method further comprises injecting effective amounts of one or more solvents into the oil-bearing formation. The one or more solvents can be selected from, for example, ammonium hydroxide, ethanol, propanol and isopropyl alcohol, although preferably, the one or more solvents comprise isopropyl alcohol and/or ammonium hydroxide.

The total concentration of isopropyl alcohol can range from about 1% to about 10% v/v, preferably about 5% v/v. The concentration of ammonium hydroxide can range from about 0.5% to 5% v/v, preferably from about 1% to about 4%, more preferably about 2% v/v.

In one embodiment, the one or more solvents are premixed and injected as a single composition into the formation. In one embodiment, if more than one solvent is used, the solvents are injected separately in any order.

In a specific embodiment, the method comprises injecting 5.0 g/L of sophorolipid, 5% isopropyl alcohol and 2% ammonium hydroxide into the formation in addition to the one or more biopolymers.

In one embodiment, the method can further comprise injecting additional agents for improving the recovery of oil from the formation, including, for example, de-scaling agents and viscosifiers. De-scaling agents can include, for example, chelators such as EDTA, sodium citrate and citric acid, which help reduce permeability by unclogging channels that have accumulated scale deposits.

In certain embodiments, the viscosifiers can include borax or boric acid. The addition of borax or boric acid aids in the control of viscosity for the biopolymer composition by increasing the rate of viscosity increase. The borax or boric acid can be applied either simultaneously with the subject biological polymer composition, or sequentially, i.e., afterwards, in an amount and at a time such as to achieve a desired increase in viscosity at a desired rate.

Depending on wellbore and formation conditions, a shut-in period of one minute to several hours may be required to permit sufficient permeability control to occur. Typically, the length of the borehole and the downhole temperature will determine the length of any shut-in period. In general, shallow, cooler formations will require longer shut-in periods possibly extending up to 24 hours or more.

In additional embodiments, the subject invention can be used for controlling water intrusion into a producing well. In particular, the compositions and methods are useful for treating high fluid permeability segments lying outside oil-bearing strata, and in particular are useful for treating water-bearing segments that may interfere with enhanced recovery of oil from oil-bearing strata. Although in most cases the water-bearing layer is below the oil-bearing stratum, those skilled in the art will appreciate that the subject method can also be used to block water-containing layers, for example quick-sand layers disposed above the oil-bearing strata.

EXAMPLES

It should be understood that the examples and embodiments described herein are for illustrative purposes only and that various modifications or changes in light thereof will be suggested to persons skilled in the art and are to be included within the spirit and purview of this application.

Example 1—Treatment of Injection Well Using Biopolymer Mixture and Biosurfactant Composition Guar gum and xanthan gum were mixed at an amount of 10 g/L of total polymer mixture in 15 barrels of water. The mixture was left for a one week retention time to allow for the polymer composition to increase in viscosity to a desired level. The polymer composition was then injected into an injection well for selective plugging of the high permeability zones of the formation.

After treatment of the injection well with the polymer mixture, a second treatment was applied to the well for the further purpose of reducing the interfacial tension within the well and increasing oil mobility. The second treatment comprised no greater than 5 g/L of sophorolipid (SLP), in 5% isopropyl alcohol and 2% ammonium hydroxide.

We claim:

1. A method of enhancing recovery of oil from an oil-bearing formation having non-uniform permeability which comprises simultaneously injecting xanthan gum and guar gum at a ratio of 50% or greater than xanthan gum to 50% or less of guar gum and additionally injecting a sophorolipid biosurfactant into the oil-bearing formation via an injection well; injecting one or more solvents selected from the group consisting of isopropyl alcohol and ammonium hydroxide into the oil-bearing formation via the injection well; injecting a flooding liquid into the injection well to displace the oil from the oil-bearing formation; and recovering the displaced oil via a production well.

2. The method of claim 1, wherein the biosurfactant is mixed with the xanthan gum and guar gum prior to being injected into the formation.

3. The method of claim 1, wherein the biosurfactant is injected after the xanthan gum and guar gum are injected into the formation.

4. The method of claim 1, wherein the sophorolipid biosurfactant is injected at a concentration of 0.01 to 5.0 g/L.

5. The method of claim 1, wherein the one or more solvents comprise 1.0% to 10.0% v/v isopropyl alcohol and 1% to 5% v/v ammonium hydroxide.

6. The method of claim 1, used to control water intrusion into a producing oil well.

7. The method of claim 1, used to selectively reduce a permeability of zones in the oil-bearing formation having greater relative permeability compared to the surrounding zones of permeability in the formation.

8. The method of claim 1, further comprising injecting 0.5 to 3 g/L of a de-scaling agent selected from the group consisting of ethylenediaminetetraaceticacid (EDTA), sodium citrate and citric acid into the formation via the injection well.

\* \* \* \* \*